Patented Sept. 14, 1937

2,092,750

UNITED STATES PATENT OFFICE 2,092,750

PROCESS OF MAKING GREEN PIGMENT

Alfred A. Brizzolara, New York, N. Y., and Alfred Siegel, Carneys Point, N. J., assignors, by mesne assignments, to E. I. du Pont de Nemours and Company, a corporation of Delaware No Drawing. Application January 31, 1935, Serial No. 4,304

4 Claims. (Cl. 134—59)

The present invention relates to novel green pigments derived from the iron salt of nitroso-beta-naphthol and process of making the same and comprises effecting the reaction between nitroso-beta-naphthol, preferably in the form of its bisulfite compound and the iron salt of a polycarboxylic or hydroxy-carboxylic acid in the proportion of 1 atom of iron with two molecular proportions of nitroso-beta-naphthol in the presence of a colorless heavy metal compound of a dispersing agent such as a sulfonated organic oily substance. The resulting pigments of our invention contain iron in the proportion of substantially one atom of iron to two molecular proportions of nitroso-beta-naphthol and in addition a certain amount of the colorless heavy metal compound of the dispersing agent.

Up to the present time iron nitroso-beta-naphthol pigments have been produced by reacting with a water soluble inorganic iron salt upon nitroso-beta-naphthol and it has been necessary to use an amount of iron not exceeding 1 atom of iron for three molecular proportions of nitroso-beta-naphthol.

It has recently been shown in an application filed concurrently herewith by Allen and Lutz, Ser. No. 4,300, that a product containing one atomic proportion of iron for 2 mols of nitroso-beta-naphthol, which is of a green color and very valuable pigmenting properties, is obtained provided one combines the nitroso-beta-naphthol with the ferrous salt of an organic carboxylic acid which in addition to the carboxylic group contains at least one additional hydroxy group attached to carbon, which latter can be part of another carboxylic group, in other words a polycarboxylic or a hydroxy-carboxylic acid. Examples of such acids are, for instance: oxalic acid, phthalic acid, lactic acid, citric acid, tartaric acid, salicylic acid, hydroxy-naphthalene-carboxylic acids, etc.

Pigments obtained in this manner are exceedingly valuable for uses where the pigment is employed in aqueous pastes or suspensions.

We have found that on drying such pigments they become hard and gritty and thereby become less useful for incorporation into organic media such as for instance for incorporation into printing inks, paints, rubber compositions, linoleum, etc., or wherever a dry pigment powder is desired.

Our invention comprises incorporating in such iron compounds of nitroso-beta-naphthol, containing iron in the proportion of 1 atom of iron to 2 mols of nitroso-beta-naphthol, an insoluble heavy metal compound of a dispersing agent, preferably one which does not impart to the pigment any color per se. The dispersing agents useful for this purpose are, for instance, soaps i. e. salts of fatty acids, rosin acids, naphthenic acids; sulfonated hydrocarbons, sulfonated glycerides, sulfated higher alcohols, sulfonated alkyl naphthalenes or other substances having the properties of lowering the surface tension of aqueous solutions. It is to be noted that for this particular purpose we do not use the water soluble salts or derivatives of such surface tension reducing agents, but only their water insoluble salts, namely those of alkaline earth metals, such as calcium, strontium, barium; magnesium salts; heavy metal salts, such as the salts of cadmium, zinc, aluminum, manganese, etc. It is important that the insoluble compound remains associated with the precipitated pigment after separation from the aqueous reaction medium, so that it can exert its action during drying.

The insoluble salt of the dispersing agent can be incorporated into the pigment at any time prior to drying. It can, for instance, be formed in situ from the soluble, for instance alkali metal salt of the agent and a metal salt during or simultaneously with the formation of the pigment. It can be prepared separately and added to the reaction mixture.

When using an insoluble salt of a sulfonated oil or other dispersing agent the small amounts used in the process will remain associated with the pigment and such amounts are effective in improving the texture of the pigment for use in paints, rubber, linoleum, or other composition in which a dry pigment powder is desired.

We also found an additional improvement in the texture of these green pigments can be obtained if the pigment suspension before separation from the reaction mixture is made acid by means of an organic, weak acid, such as acetic acid, formic acid, other aliphatic, or aromatic acids, or dilute mineral acid.

The acid treatment referred to herein is also applicable to iron nitroso-beta-naphthol pigments prepared in the absence of the insoluble salts of dispersing agents.

The following examples will illustrate our invention further:

*Example 1.*—A solution of the bisulfite compound of nitroso-beta-naphthol was obtained in the well known manner from 144 parts (1 mol.) beta-naphthol.

To this solution was added at a temperature of 20° C. a suspension of 20 parts Turkey red oil (70%) in 200 parts of water. This was followed by the addition of a solution of 8 parts cadmium sulfate (anhydrous, equal to 0.038 mol.) in 100 parts of water. A solution of 7.5 parts of oxalic acid (0.0593 mol.) in 200 parts of water was then added and stirring continued for 15 minutes.

A suspension of 90 parts of ferrous oxalate (0.5 mol.) in 250 parts of water was then added. The green pigment was formed and precipitated by adding in 10 minutes at 20° C. a solution of 248 parts of soda ash (2.25 mols) in 3890 parts of water. The temperature was then raised uniformly to 40° C. in ½ hour. The precipitated pigment was filtered and washed until the washings were neutral to red litmus. It was then dried at 60° C.

215 parts of an intense and bright green pigment were obtained which has a particularly fine texture and is eminently suited for incorporation into organic compositions, especially for compounding with rubber into which it disperses with facility and uniformity. In shade the pigment was equal to a pigment prepared without the use of the cadmium salt of sulfonated Turkey red oil, but it had a much softer texture and greater strength.

*Example 2.*—A solution of the bisulfite compound of nitroso-beta-naphthol was obtained in the well known manner from 144 parts (1 mol.) beta-naphthol and neutralized to avoid the presence of free mineral acid.

To a suspension of 30 parts Turkey red oil (70%) in 1000 parts of water was added a solution of 5 parts of cadmium sulfate crystals (0.0065 mol.) in 100 parts of water. This suspension was added to the above solution of the bisulfite compond of nitroso-beta-naphthol. The mixture was then stirred at 20° C. for 15 minutes.

A suspension of 90 parts ferrous oxalate (0.5 mol.) in 2300 parts of water was then added. This was followed by the addition of a solution of 7.5 parts of oxalic acid (0.0593 mol.) in 200 parts of water and stirring was continued for 15 minutes at 20° C.

The green pigment formed and it was precipitated by the addition in 10 minutes at 20° C. of a solution of 213 parts of soda ash (2.01 mols) in 1500 parts of water. The temperature was then raised uniformly to 40° C. in ½ hour. The pigment precipitated, it was filtered off, washed to neutrality and dried. The product was in properties entirely similar to the product of Example 1.

*Example 3.*—The procedure was exactly the same as in Example 2 up to the precipitation of the pigment.

To the pigment suspended in the mother liquor of the reaction there was added a solution of 200 parts of acetic acid (3.33 mols) in 1000 parts of water. After stirring for 5 minutes at 40° C. the precipitated pigment was filtered and washed until neutral to blue litmus. The pigment was then dried at 60° C. The yield was 200 parts.

The dried pigment was exceedingly soft in texture, of a bright green shade; it dispersed readily and uniformly in rubber and paint vehicles. It was also very suitable for incorporation into printing inks and similar painting and coating compositions, or for enamels and lacquers.

The first of these examples illustrates broadly the treatment of the 1:2 iron nitroso-beta-naphthol pigment with an insoluble salt of a dispersing agent when formed in the reaction mixture; the second example illustrates the procedure where the insoluble salt of the dispersing agent is formed separately and then added to the reaction mixture. The results are substantially the same in the two procedures.

The third example illustrates the further improvement of rendering the pigment suspension slightly acid before filtering.

These examples must be taken as illustrating the manipulations only. There are several factors which can be varied to a large extent without departing from the spirit of our invention:

Instead of the ferrous salt of oxalic acid we can use the ferrous salts of other polycarboxylic or hydroxy-carboxylic acids, or other organic acids which contain a hydroxy group attached to carbon in addition to a carboxylic group, as disclosed and claimed in the above identified copending application of Allen and Lutz.

It is not absolutely necessary to employ the ferrous salt in exactly stoichiometric proportions as a slight and reasonable excess of iron salt does not affect the results.

Instead of the insoluble salt of Turkey red oil we can use insoluble salts of other dispersing or surface tension reducing agents such as the salts of other sulfonated vegetable or animal oils or any fatty acid glycerides, or sulfonated petroleum oils, sulfated higher aliphatic alcohols, sulfonated alkyl-naphthalenes, etc., or salts of straight fatty acids, rosin acids, etc.

Instead of cadmium salts of such dispersing agents we can use the insoluble salts of calcium, strontium, barium, magnesium, zinc, etc., or any other metal which forms insoluble colorless compounds with the dispersing agent.

Our final treatment of the precipitated pigment with acid as illustrated in Example 3 is not limited to acetic acid but can be performed with any weak organic acid, or dilute mineral acid, the only requirement is that when separating the pigment from the reaction mixture the latter be acid.

We claim:

1. In a process of producing a pigment comprising the iron compound of nitroso-beta-naphthol in which iron is used in the proportion of one atom of iron for each two molecular proportions of nitroso-beta-naphthol, the steps of incorporating in the precipitated pigment before drying a water insoluble salt of a dispersing agent, which agent in its water soluble forms reduces the surface tension of aqueous solutions in which it is dissolved, then acidifying the suspension of the pigment, separating the pigment from the reaction mixture and drying it while still admixed with the water insoluble salt of the dispersing agent.

2. The process of claim 1 in which the acid is acetic acid.

3. The process of claim 1 in which the dispersing agent is Turkey red oil combined with a metal of the group consisting of calcium, strontium, barium, magnesium, zinc and cadmium, and the acidifying agent is acetic acid.

4. The process of claim 1 in which the dispersing agent is Turkey red oil combined with cadmium, and the acidifying agent is acetic acid.

ALFRED A. BRIZZOLARA.
ALFRED SIEGEL.